(12) United States Patent
Ishizaka

(10) Patent No.: US 7,162,491 B2
(45) Date of Patent: Jan. 9, 2007

(54) DATA PROCESSING SYSTEM, DATA PROCESSING METHOD AND COMPUTER PROGRAM

(75) Inventor: Takashi Ishizaka, Tokyo (JP)

(73) Assignee: Beacon Information Technology Inc., Tokyo (JP)

( * ) Notice: Subject to any disclaimer, the term of this patent is extended or adjusted under 35 U.S.C. 154(b) by 352 days.

(21) Appl. No.: 10/066,212

(22) Filed: Feb. 1, 2002

(65) Prior Publication Data

US 2002/0107836 A1 Aug. 8, 2002

(30) Foreign Application Priority Data

Feb. 6, 2001 (JP) ............... 2001-030142

(51) Int. Cl.
*G06F 17/00* (2006.01)
*G06F 12/00* (2006.01)

(52) U.S. Cl. .............. 707/103 X; 707/3; 707/10; 707/101; 707/102; 707/104.1; 707/201; 707/205; 711/201; 711/202

(58) Field of Classification Search ............ 707/3, 707/201, 10, 101, 102, 103 X, 104.1; 711/205, 711/201, 202; 705/10; 715/526
See application file for complete search history.

(56) References Cited

U.S. PATENT DOCUMENTS

| | | | | |
|---|---|---|---|---|
| 5,842,207 A | * | 11/1998 | Fujiwara et al. ............... 707/7 |
| 5,860,074 A | * | 1/1999 | Rowe et al. .................. 715/526 |
| 5,860,136 A | * | 1/1999 | Fenner ......................... 711/201 |
| 5,864,842 A | * | 1/1999 | Pederson et al. .............. 707/3 |
| 6,009,502 A | * | 12/1999 | Boeuf .......................... 711/170 |
| 6,101,495 A | * | 8/2000 | Tsuchida et al. ............... 707/4 |
| 6,163,781 A | * | 12/2000 | Wess, Jr. ................ 707/103 X |
| 6,192,359 B1 | * | 2/2001 | Tsuchida et al. ............... 707/4 |
| 6,457,021 B1 | * | 9/2002 | Berkowitz et al. ........... 707/201 |
| 6,505,189 B1 | * | 1/2003 | On Au et al. .................... 707/2 |
| 6,684,203 B1 | * | 1/2004 | Waddington et al. ........... 707/3 |
| 6,819,670 B1 | * | 11/2004 | Fenner ......................... 370/392 |
| 6,963,882 B1 | * | 11/2005 | Elko et al. ................... 707/200 |
| 2002/0062241 A1 | * | 5/2002 | Rubio et al. ................... 705/10 |

* cited by examiner

*Primary Examiner*—Thuy N. Pardo
(74) *Attorney, Agent, or Firm*—Bachman & LaPointe P.C.

(57) ABSTRACT

The present invention is to provide a system capable of preventing an increase in load even if the amount of data increases. Upon receipt of a retrieval request, a main control part specifies, from a first customer table, row numbers adapted to the retrieval request. Then the main control part determines the range of data to be retrieved in a second customer table according to predetermined computational logic from the row numbers specified, the number of rows capable of being recorded in the first customer table for each customer, and the number of rows capable of being recorded in the second customer table for each customer.

10 Claims, 5 Drawing Sheets

FIG.2

| ROW NUMBER | CUSTOMER ID |
|---|---|
| No.1 | CUSTOMER A |
| No.2 | CUSTOMER B |
| No.3 | CUSTOMER C |
| ⋮ | ⋮ |

FIG.3

| CUSTOMER TABLE NAME | NUMBER OF ROWS |
|---|---|
| CUSTOMER TABLE #1 | 100 |
| CUSTOMER TABLE #2 | 200 |
| CUSTOMER TABLE #3 | 300 |
| ⋮ | ⋮ |

DATA PROCESSING SYSTEM, DATA PROCESSING METHOD AND COMPUTER PROGRAM

CROSS-REFERENCE TO RELATED APPLICATIONS

This application is based upon and claims the benefit of priority from the prior Japanese Patent Application No. 2001-030142, filed Feb. 6, 2001, the entire contents of which are incorporated herein by reference.

BACKGROUND OF THE INVENTION

1. Field of the Invention

The present invention relates to data processing that is characteristic of a classification of data into two or more data areas associated by an object, such as customer, employee, patient, criminal, product, airplane, facility or nuclear reactor, so that the data will be recorded in and read from the corresponding data areas, respectively. In particular, the present invention relates to an improved technique capable of recording and retrieving data independently of the type of object and the amount of data.

2. Description of the Related Art

When various data related to customers are collected and managed in a storage device, these data are generally divided into plural data areas, for example, tables or files (hereinafter, the data areas are assumed to be "tables") so that the data will be managed in the corresponding tables, respectively.

For example, it is assumed that information about an ID (customer ID), an event date, event contents, what event medium (a direct mail, e-mail or the like) informs the customer of the event, etc. is recorded in an event history table for managing what event (a sale, a clearance sale or a campaign) and when the event has been offered to the customer, and information about a customer ID, a purchased date, a product name and the amount is recorded in a purchase history table for managing the customer's purchase record. In other words, it is assumed that the customer's information is divided into and managed in two tables, the event history table and purchase history table.

The two tables are associated with each other by basic data such as the customer ID, which makes it possible to retrieve data across the two tables. For example, if a product purchased by a customer for whom a campaign C was conducted is to be found, the event history table is retrieved for the customer for whom the "campaign C" was conducted to obtain the customer ID of the customer. Then, the purchase history table is retrieved by the customer ID to specify the purchase record of the customer ID concerned, After that, all the products purchased are output to a display or the like.

It is considered that the above-mentioned sequence of processing is carried out by two methods: one to execute an explicitly described procedure, and the other to automatically or implicitly, that is, implicitly interpret data by means of a data processing system (database system and the like). In either case, explicitly or implicitly, the two tables are associated with each other by performing retrieval processing by the customer ID.

Detailed information about the customer identified from one table is obtained by searching the other table by the customer ID. This processing is called a table join. The table join, however, is accompanied by plural processing steps, so that as the number of data to be processed increases, more processing time is required, which may be of no practical use.

Various techniques for speeding up the process of table join have been developed. Such conventional techniques are all to record the relationship between tables in a storage device in order to speed up the processing. Therefore, since the process to input and output data from and to the storage device is needed, speeding up the process is limited. Further, since all the relationship between tables needs to be recorded in the storage device, the number of tables increases to increase the information on the relationship between tables, which may result in overhead and increased space in the storage device for detecting and recording the relationship between the tables.

In the table join processing for retrieval for customer information which is dividedly managed in plural tables by a condition across the tables, a processing load applied upon execution of the table join processing increases as the number of customers to be managed increases. As a result, there is a high possibility that the processing load will be too heavy to achieve actual operability. Further, when the number of tables to be processed increases the number of table joins and hence processing load, the processing load may also be too heavy to achieve actual operability.

SUMMARY OF THE INVENTION

The present invention has been made in view of the above-mentioned circumstances, and it is an object thereof to provide a data processing mechanism capable of achieving a constant processing speed independent of any factor, for example, the amount of data.

In one aspect of the present invention, there is provided a data processing system having a storage device for recording data which belongs to an object representing a target event. In the storage device, one or more tables defining each object, each object or recording areas in one table is individualized by an identifier capable of taking a numerical form.

The present invention features that the data processing system comprises specification means for specifying an identifier related to the data concerned and the number of recording areas of the table to be accessed in response to a data accessing request, and range of area determining means for determining the range of recording areas in the table to be accessed by executing a predetermined computational algorithm which uses as variable factors at least the identifier and the number of recording areas specified by the specification means. This configuration makes it possible to access data, irrespective of the type of object and the amount of data.

The term "access" means recording, deletion, update or reading of data. Further, the term "table" means data recording areas recorded on a predetermined unit in the storage device.

The specification means and the range determining means may be implemented by one module. In this case, the module is composed of a data recording module for accessing the storage device in response to input of data and a data recording request and recording the data concerned in the recording areas of any one of table, and/or a data retrieval table for accessing the storage device in response to a retrieval request and retrieving the data concerned form the one or more tables.

The present invention can construct a data processing system further comprising: means for storing first and second tables associated with each other by an object and accepting a table join request for joining the first and second tables and retrieval conditions therefor; means for decomposing the accepted retrieval conditions on a table basis; and retrieval means for executing the table join request accepted.

In this case, the specification means specifies, for example, an identifier of a corresponding recording area from the first table on the basis of the retrieval condition decomposed for the first table, as well as the number of recording areas (Na) per object of the first table and the number of recording areas (Nb) per object of the second table, and the range of area determining means determines the range of recording areas to be retrieved in the second table by executing a computational algorithm from the identifier and the respective numbers of recording areas.

Then the retrieval means performs data retrieval processing for the range of recording areas determined by the range of area determining means according to the retrieval condition for the second table. In such a data processing system, since the retrieval means performs the data retrieval processing according to the retrieval condition for the second table, So that data retrieval is enabled irrespective of the type of object and the amount of data.

In another aspect of the present invention, there is provided a data processing method for use in a computer system having a storage device for recording data which belongs to an object representing a target event, in which one or more tables are stored in the storage device on an object basis, each of the tables defining the number of data recordable areas, and each of the objects and recording areas in each table individualized by an identifier capable of taking numerical form, the method comprising: a processing step of specifying an identifier related to the data concerned and the number of recording areas of the table to be accessed in response to an access request for the data containing identification information for identifying the object; and a processing step of determining the range of recording areas in the table to be accessed by executing a predetermined computational algorithm which uses as variable factors at least the identifier and the number of recording areas specified by the specification means.

In still another aspect of the present invention, there is provided a computer-readable recording medium on which a computer program is recorded, the computer program being used in a computer system having a storage device for recording data which belongs to an object representing a target event, in which one or more tables are stored in the storage device on an object basis, each of the tables defining the number of data recordable areas, and each of the objects and recording areas in each table individualized by an identifier capable of taking numerical form, the computer program executing the following processing steps: of specifying an identifier related to the data concerned and the number of recording areas of the table to be accessed in response to an access request for the data containing identification information for identifying the object; and determining the range of recording areas in the table to be accessed by executing a predetermined computational algorithm which uses as variable factors at least the identifier and the number of recording areas specified.

In yet another aspect of the present invention, there is provided a computer program for use in a computer system having a storage device for recording data which belongs to an object representing a target event, in which one or more tables are stored in the storage device on an object basis, each of the tables defining the number of data recordable areas, and each of the objects and recording areas in each table individualized by an identifier capable of taking numerical form, the program constructing: specification means for specifying an identifier related to the data concerned and the number of recording areas of the table to be accessed in response to a data accessing request for the data containing identification information for identifying the object; and range of area determining means for determining the range of recording areas in the table to be accessed by executing a predetermined computational algorithm which uses as variable factors at least the identifier and the number of recording areas specified by the specification means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

These objects and other objects and advantages of the present invention will become more apparent upon reading of the following detailed description and the accompanying drawings in which:

FIG. 2 is a table showing the contents of a customer ID table;

FIG. 3 is a table showing the contents of a number of row managing table;

DESCRIPTION OF THE PREFERRED EMBODIMENTS

The following section will describe an embodiment of a data processing system to which the present invention is applied.

Figure 1:
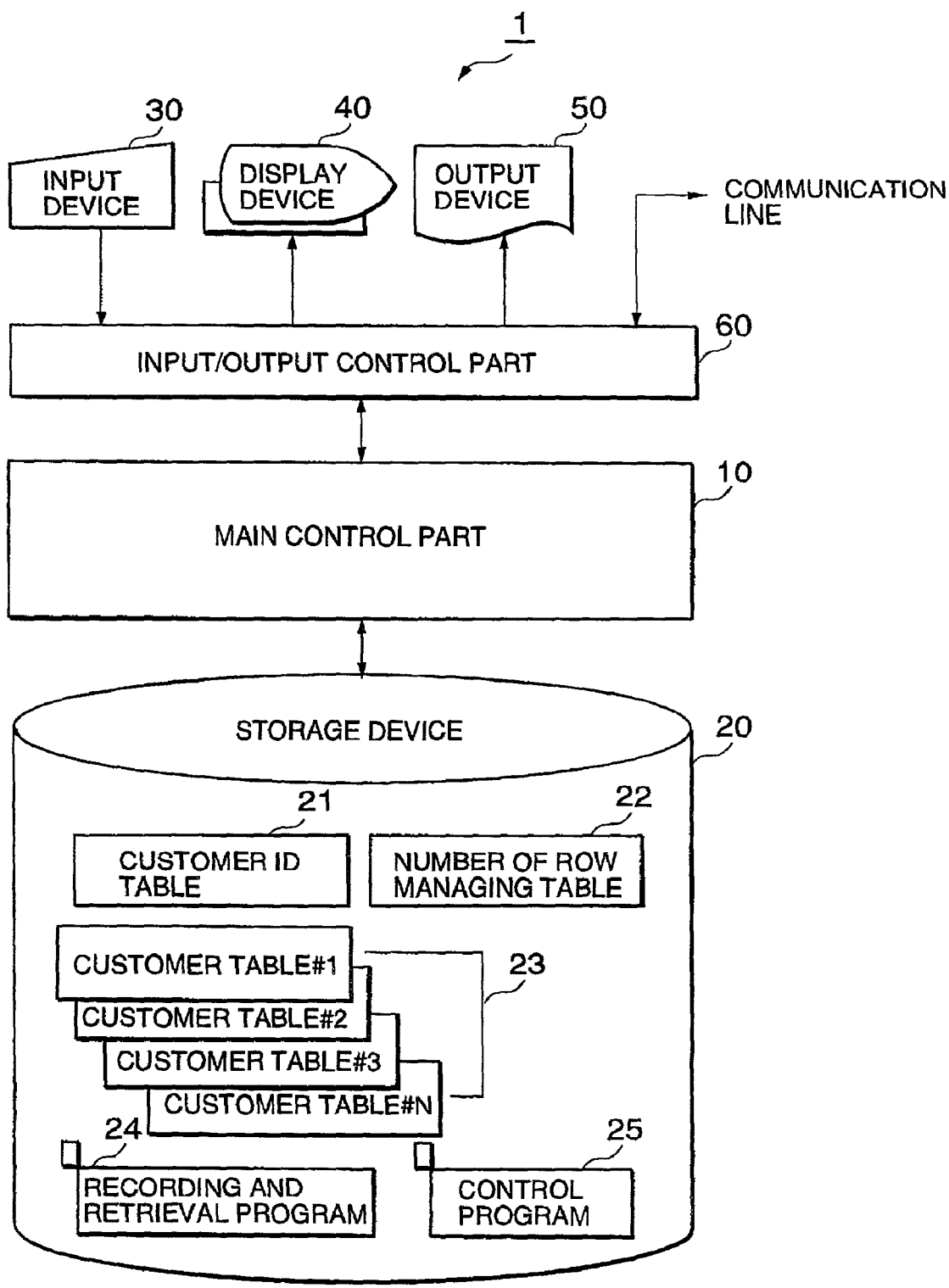
FIG. 1 is a block diagram showing a hardware configuration of an embodiment of a data processing system to which the present invention is applied.

FIG. 1 is a block diagram showing a hardware configuration of the data processing system.

A computer system and a computer program work together to realize the data processing system 1. The data processing system 1 is constituted of a main control part 10, a storage device 20 accessible by the main control part 10, an input device 30 for accepting various requests from an operator, a display device 40, an output device 50 for outputting data processing results to an external system, and an input/output control part 60 for control input and output of data among the main control part 10, the input device 30, the display device 40 and the output device 50.

The main control part 10 including a CPU controls major parts in the system, and controls data recording module and data search module to be described later to access the storage device 20, that is, performs data recording and searching.

The storage device 20 is an external storage device such as a hard disk or a semiconductor memory such as a RAM. In the storage device 20, not only plural tables for recording and managing data are stored on an object basis, but also a recording/search program 24 as one of computer (application) programs characteristic of the present invention and a control program 25 such as an operating system are stored, such that the main control part 10 can read the tables and programs as required. In the specification, the term "table" means all data recording means such as files as well as data tables in a narrow sense.

In the embodiment, customers are taken as an example of an object to describe a case where various data on customers are recorded and managed in a customer ID table 21, a number of row managing table 22 and a customer table 23.

The recording/search program 24 may be stored in the storage device 20 at the time of system construction, or it may be prerecorded in a portable recording medium, such as a flexible disk, optical disk, magneto-optical disk, CD-ROM, CD-R or DVD-ROM, and installed in the storage device 20 as required.

The recording/search program 24 is to selectively form, in the main control part 10, a data recording module for recording data on a customer basis and a data search module for performing a data search in response to a search request. The data recording module and the data search module function as the identification means and the scope determining means according to the present invention, respectively.

The control program 25 performs part of the processing on in accordance with instructions from the recording/search program 24 to form the above-mentioned modules through the processing, or in cooperation with another application program. For convenience sake, it is assumed below that the above-mentioned modules are formed by the recording/searching program 24 alone.

The input device 30 includes a keyboard, a mouse and the like, and has the function of accepting a data recording request, a search request and other requests from the operator and forwarding these requests to the main control part 10 through the input/output control part 60. These requests may be entered directly from the input device 30, or forwarded to the main control part 10 through a communication line and the input/output control part 60 without passing through the input device 30. The communication line shown in FIG. 1 is used in such a case.

The display device 40 is a CRT (Cathode Ray Tube) or FPD (Flat Panel Displays, and has the function of displaying processing results from the main control part 10 according to the contents of various requests or in response to the requests from the operator.

The output device 50 includes a printer, a disk device and the like, and has the function of outputting processing results form the main control part 10. When the output device 50 is a printer, the processing results are printed out, while when it is a disk device, the processing results are internally stored so that they can be read therefrom as required.

The input/output control part 60 forwards to the main control part 10 various requests accepted through the input device 30 or the communication line, instructs the display device 40 to display the contents of these requests, and forwards to the display device 40 or the output device 50 processing results executed according to the requests accepted through the input device 30 or the communication line.

Next, the contents of the customer ID table 21, the number of row managing table 22 and the customer table 23 in the embodiment will be described.

<Customer ID Table>

FIG. 2 is a diagram showing an example of the customer ID table 21. In the customer ID table 21, a combination of an identifier for identifying a row as a unit of data recording and a customer ID for uniquely identifying a customer are recorded for each customer. The row number takes a natural number such as 1, 2, 3, . . .

Inside the table, recording of duplication of the same customer ID is avoided. The customer ID table 21 is used to determine whether a customer ID is already recorded, or identify the row number of the customer ID that is already recorded.

<Number of Row Managing Table>

FIG. 3 is a diagram showing an example of the number of row managing table 22. In the number of row managing table 22, the number of data recording areas assignable to each customer, that is, the number of data rows is recorded for each table. In the example of FIG. 3, 100 rows are assignable per customer in a customer table #1, 200 rows are assignable per customer in a customer table #2, and 1000 rows are assignable per customer in a customer table 3.

<Customer Table>

The customer table 23 is a table for recording various data related to customers, and can be identified by respective identifiers (also "row numbers") which are consecutive numbers across the plural rows (recording areas), The customer table 23 may be a single table or consist of two or more tables, depending on the kinds of data derived from each customer. It should be noted that the range of row numbers in the customer table 23 varies according to what customer ID the data belongs to. For example, when data are to be recorded in a certain customer table, unused row numbers ranging from 101 to 200 are assigned so that the areas of recorded data can be specified from the row numbers assigned.

Figure 4:
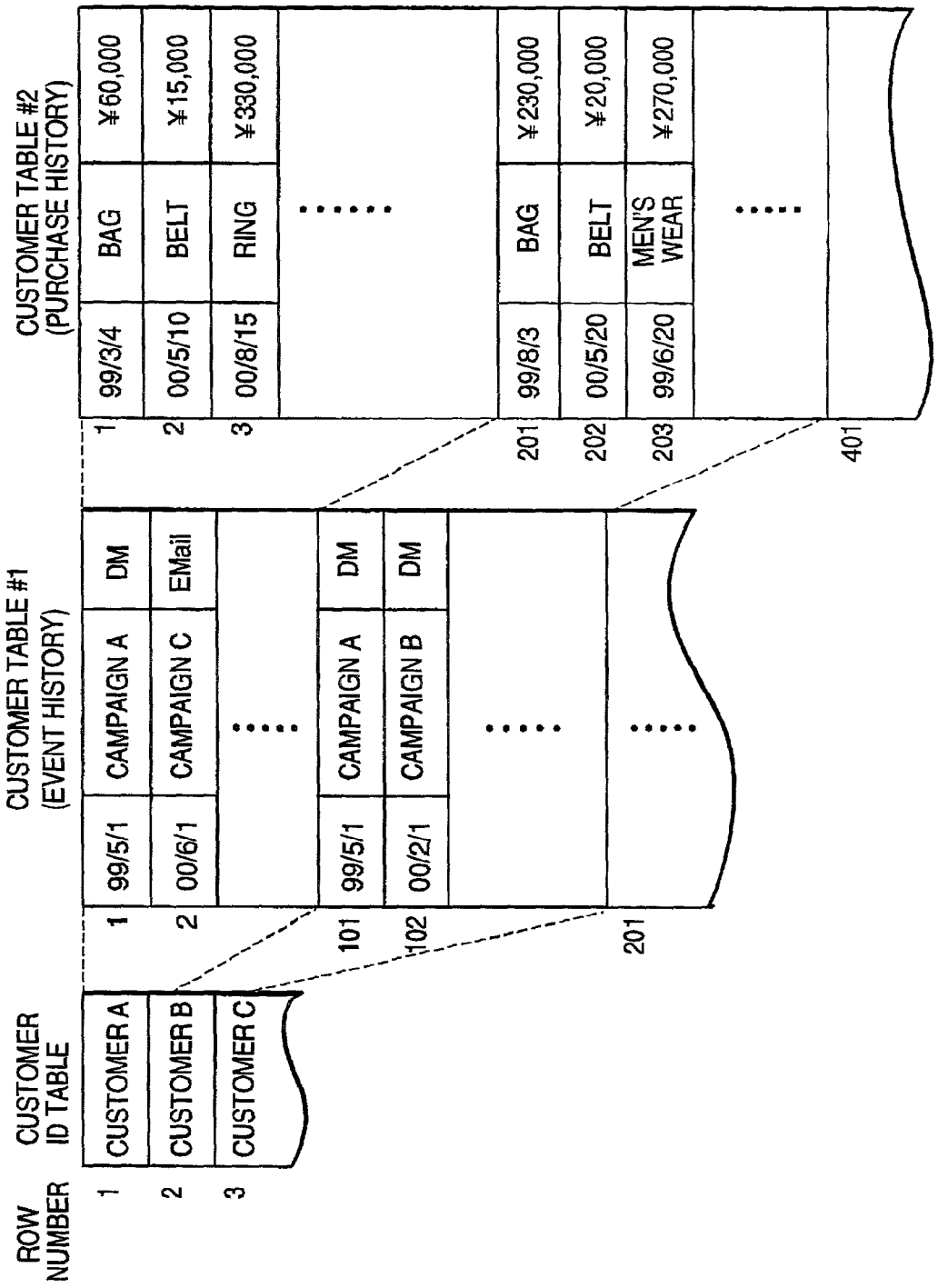
FIG. 4 is a diagram showing a relationship between the customer ID table and customer tables.

FIG. 4 is a diagram showing an interrelationship between the customer ID table 21 and the customer table 23. Here, two customer tables 23 (customer table #1 and customer table #2 ) are cited. In the following description, one customer table 23 is expressed as the customer table #1 and the other is as the customer table #2.

In the customer table #1, a history of events for customers is recorded for each customer, while in the customer table #2, a history of purchases based on the events is recorded. These tables are associated with each other, and any other data can be specified from any one of the customer ID, the event and the purchase history. For example, data containing the customer ID "customer A" are recorded in rows 1 to 100 of the customer table #1, and in rows 1 to 200 of the customer table #2. In other words, the data in these ranges are all related to the customer in either table. Similarly, data containing the customer ID "customer B" are recorded in rows 100 to 200 of the customer table #1, and in rows 201 to 400 of the customer table #2.

[Data Processing Method]

<Data Recording Processing>

Next, an embodiment of a data processing method executed in the data processing system 1 will be described.

Figure 5:
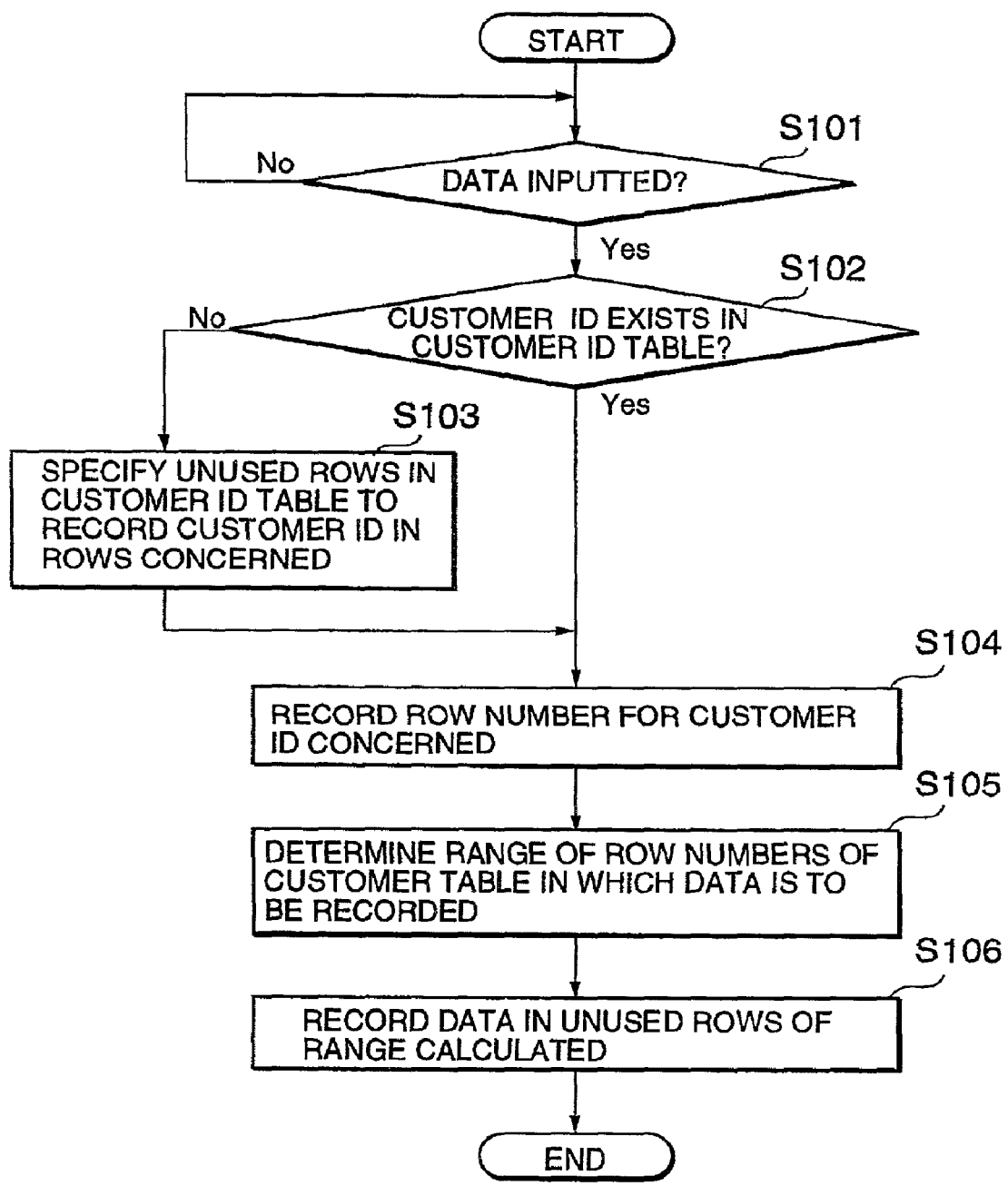
FIG. 5 is a flowchart showing data recording processing according to the embodiment of the present invention.

Referring first to FIG. 5, data recording processing by the data recording module will be described.

When data containing a customer ID is input through the input device 30 (Yes in step S101), the main control part 10 (data recording module) obtains the inputted data through the input/output control part 60. Then the data recording module checks whether the same ID as the customer ID contained in the data exists in the customer ID table 21. If exists (Yes in step S102), the row number corresponding to the customer ID existed is set to "M", and temporarily recorded in the work area of the main control part. Assuming that the data are related to the customer B, since the customer B exists in an area indicated with the row number, "2" of the customer ID table 21, "2" is temporarily recorded as "M". On the other hand, if the customer B does not exist in the customer ID table 21 (No in step S102), an unused row in the customer ID table 21 is so checked that the new customer ID concerned will be correlated with the row (step S103). Then the row number is set to "M", and temporarily recorded in the work area (step S104).

Next, the data recording module checks the number of row managing table 22 to specify the number of rows to be ensured per customer for recording data in the customer table so as to temporarily record the determined value in the work area. In this case, the value is set to "N". Since the kinds of data handled by the customer table 23 and the data structure are determined prior to the data recording processing, data are considered to be inputted in a form suitable for the structure of the customer table 23. In the example of FIG. 4, if the data are related to the event history, they are recorded in the customer table #2 as dates, events (campaigns A, B, C, . . . ), notification means (direct mails (DM), e-mails, . . . ), etc., while if the data are related to the purchase history for each event, they are recorded in the customer table #1 as dates, product names (bag, belt, . . . ), prices, etc. The number of rows (N) is specified such that 100 rows are for the customer table #1 and 200 rows for the customer table #2. The value (N) is temporarily recorded in the work area.

When the values M and N are specified by the above-mentioned processing, the data recording module determines, from these values, the range of row numbers in which data are to be recorded in each customer table in accordance with the following computational algorithm:

$$N*(M-1)+1 \sim N*M$$

For example, since the values M and N for the customer A are "1" and "100" respectively, row numbers of the customer table #1 in which event data on the customer A can be recorded ranges from "1" to "100", while since the values M and N for the customer B are "2" to "100" respectively, row numbers of the customer table #1 in which event data on the customer B can be recorded ranges from "101" to "200".

Upon recording data, unused rows are selected from the range of row numbers so that the data will be recorded in the selected rows (step S106). For example, when a piece of event data for the customer B is to be recorded in the customer table #1, if the $101^{st}$ line is used and the $102^{nd}$ line has yet to be used, the data concerned is recorded in the $102^{nd}$ line.

Thus, since the areas (the range of line numbers) can be determined merely by executing the computational algorithm, high-speed recording processing can be attained irrespective of the amount of data.

<Table Join and Retrieval>

Figure 6:
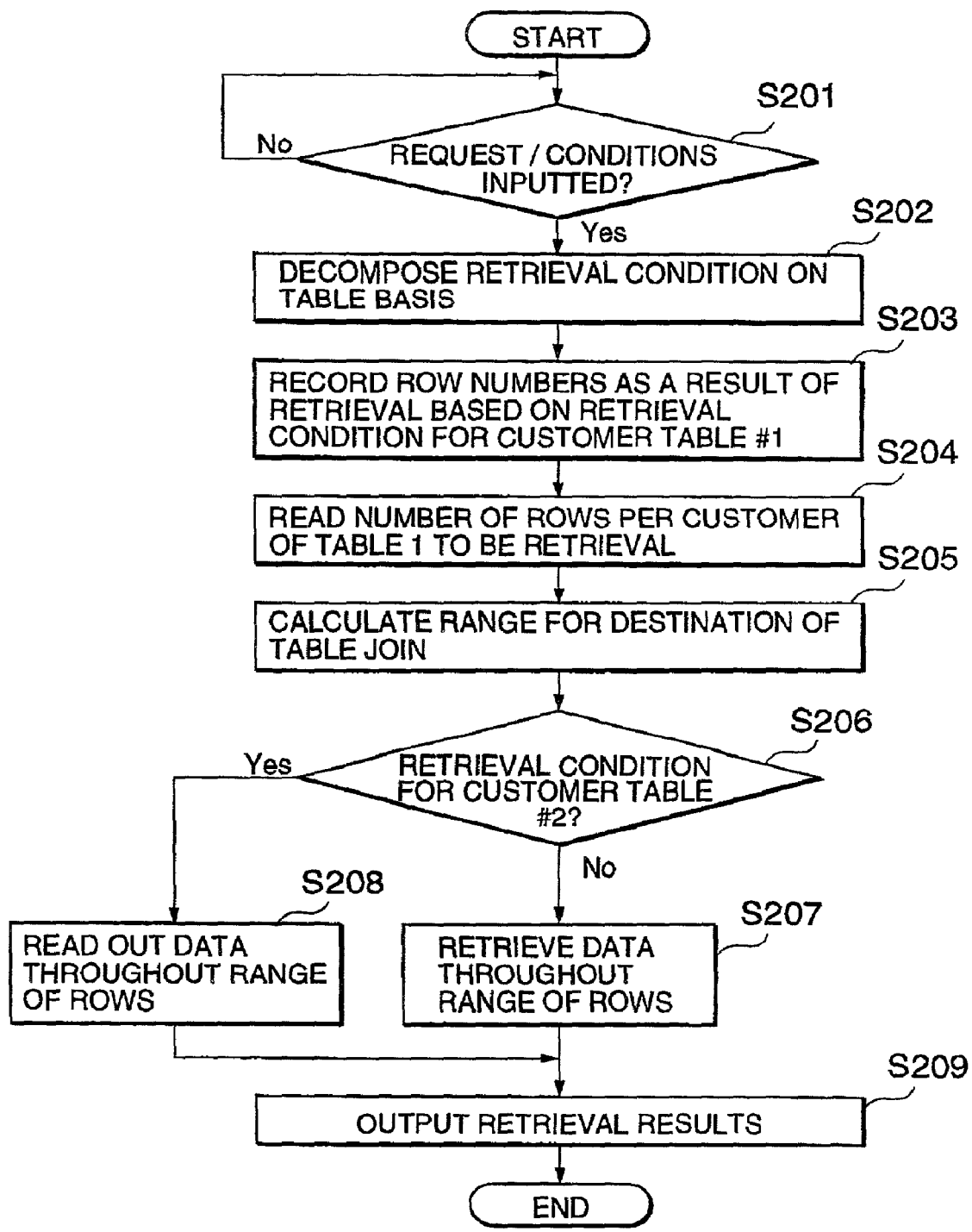
FIG. 6 is a flowchart showing table join and retrieval processing according to the embodiment of the present invention.

Referring next to FIG. 6, table join and retrieval processing will be described. This processing is executed by the data retrieval module.

When the operator enters a retrieval request and retrieval conditions through the input device 30, these data are sent to the data retrieval module through the input/output control part 60 (Yes in step S201) in which table join and retrieval operations are performed.

The data retrieval module decomposes the inputted retrieval conditions on a table basis (step S202). Based on the decomposed retrieval condition, the customer table #1 is first retrieved, and the number of rows obtained as a result of retrieval is temporarily recorded in the work area (step S203). This value is set to "αa". Then the number of row managing table 22 is so checked that the number of rows per customer of the table to be retrieved will be read out and temporarily recorded in the work area (step S204). This value is set to "Na".

The data retrieval module further checks the number of row managing table 22 for the number of rows per customer of the other customer table #2 to specify and temporarily record the number of rows of the customer table #2 in the work area (step S204). This value is set to "Nb".

After that, the data retrieval module executes the following computational algorithm to determine the range of row numbers of the other table to which the one table is to be joined:

$$[αa/Na]*Nb+1 \sim [αa/Na+1]*Nb,$$

where the term inside the square brackets is a Gauss function, that is, the maximum integral value among values obtained as a result of calculation of the term inside the square brackets.

The range of row numbers calculated such above denotes the range of data rows of the customer table #2 associated with the customer who met the retrieval conditions for the customer table #1. If there is no retrieval condition for the customer table #2 (No in step S206), the data retrieval module reads out data row by row throughout the range determined to send these data as retrieval results to the display device 40 and/or output device 50 through the input/output control part 60 (steps S207 and S209).

If there is any retrieval condition for the customer table #2 (Yes in step S206), the data retrieval module performs retrieval processing using the retrieval condition for each row of the determined range in the customer table #2 to determine the logical product of row number obtained and all the row numbers of the range determined. In other words, the data retrieval module checks whether the results of the retrieval from the customer table #2 using the retrieval condition falls within the range of row numbers. Then the data retrieval module selects all the matching data to obtain final retrieval results so as to the retrieval results obtained to the display device 40 and/or output device 50 through the input/output control part 60 (steps S208 and S209).

Thus, since the range of data (capable of being specified by row numbers) to be retrieval can be determined merely by executing the computational algorithm, high-speed table join and retrieval processing can be attained irrespective of the amount of data.

Specific examples of table join and retrieval operations will be described below.

EXAMPLE 1

The following will describe an example of table join and retrieval operations of the customer table #1 (event history) and the customer table #2 (purchase history) shown in FIG. 4 in response to a retrieval request for "finding products purchased by customers at which campaign C was aimed."

In this case, the retrieval conditions are decomposed into: (1) a condition for acquiring from the customer table #1 customers for which the "campaign C" was conducted, and (2) a condition for acquiring from the customer table #2 purchase history records related to the customers found in the customer table #1 (table join).

The data retrieval module retrieves customers for which the "campaign C" was conducted from the customer table #1. In the example of FIG. 4, the retrieval result corresponds to the row number, "2" of the customer table #1 (αa=2).

Then, from the number of row managing table 22, "100" is obtained as the number of rows to be ensured per customer in the customer table #1 (Na=100). Further, from the number or row managing table 22, "200" is obtained as the number of rows to be ensured per customer in the customer table #2 as the partner to which the customer table #1 is joined (Nb=200). From these numerous values, the data retrieval module executes the following computational algorithm to determine the range of row numbers of the customer table #2 in which corresponding data are recorded:

$$[\alpha a/Na]*Nb+1 \sim [\alpha a/Na+1]*Nb=[2/100]*200+1 \sim [2/100+1]*200=0 *200+1 \sim [0 +1]*200=1 \sim 200$$

In other words, target data can be obtained by outputting the contents of data from the row numbers ranging from "1" to "200" of the customer table #2.

Example 2

The following will describe an example of more complicated retrieval processing of the customer table #1 (event history) and the customer table #2 (purchase history) shown in FIG. 4 in response to a retrieval request for "finding customer data related to a customer who was a target of the campaign C and purchased a belt."

In this case, the retrieval conditions are decomposed into: (1) a condition for acquiring from the customer table #1 customers for which the "campaign C" was conducted, (2) a condition for acquiring from the customer table #2 purchase history records related to the customers found in the customer table #1 (table join), (3) a condition for acquiring from the customer table #2 customers who purchased the "belt", and (4) a condition for acquiring the logical product of the results of joining tables based on the condition (2) and the retrieval results based on the condition (3).

At first, the data retrieval module retrieves customers for which the "campaign C" was conducted from the customer table #1 to obtain the row number, "2" of the customer table #1 ($\alpha$a=2). Then, from the number or row managing table 22, "100" is obtained as the number of rows to be ensured per customer in the customer table #1 (Na=100). Further, from the number or row managing table 22, "200" is obtained as the number of rows to be ensured per customer in the customer table #2 as the partner to which the customer table #1 is joined (Nb=200). From these numerous values, the data retrieval module executes the following computational algorithm to determine the range of row numbers of the customer table #2 in which corresponding data are recorded:

$$[\alpha a/Na]*Nb+1 \sim [\alpha a/Na+1]*Nb=[2/100 ]*200+1 \sim [2/100+1]*200=0*200+1 \sim [0+1]*200=1 \sim 200$$

Then the data retrieval module performs retrieval processing for data on customers who purchased the "belt". The retrieval results correspond to the row numbers "2" and "202". After that, the data retrieval module determines a row number or numbers contained in both the range of row numbers determined ("1" to "200") and the retrieval results "2" and "202". In this case, the result is the row number "2", which indicates that a customer having the customer ID A is the customer who was a target for the campaign C and purchased the belt.

The above-mentioned retrieval procedure is an example, and any other procedures may be considered.

For example, after completion of determination of the range of row numbers, data may be read out on a row basis throughout the range while determining whether the data meets the retrieval condition. The procedure, however, includes processing for acquiring from the customer table #2 data on the same customer as that obtained from the customer table #1.

<Modifications and Applicability to other Fields>

The embodiment described such a case that the customer ID table 21 independently existed in the storage device 20, but the customer ID table 21 may be replaced with one of the customer table 23. In this case, the processing system and method can be realized with fewer tables.

The embodiment also described such a case that two or more customer tables 23 existed, but if the number of customer tables 23 is only one, the present invention has the same effects, that is, it can be self-joined. For example, it corresponds to a case where a customer who purchased both the bag and belt is found from the customer table #2 recording data related to the purchase history.

Further, the embodiment described such a case that customer data was used as data on an object to be processed, but the object capable of being processed can be generalized. For example, employees, patients, criminals, products, airplanes, facilities, nuclear reactors, etc. can be used as the object so that various data derived from the object will be targeted. It is particularly effective when plural data exist (particularly history records and the like).

Furthermore, the embodiment took as an example a processing system capable of recording and retrieving data using table row numbers as data recording areas, but the present invention is embodied in any other systems not using the row numbers as long as it has identifiers each of which can uniquely specify a row and take numerical form. Similarly, the present invention may also be realized by using identifiers each of which can uniquely identify a column as a recording area instead of the row.

As discussed above, the data processing as adopted by the data processing system 1 according to the embodiment makes it possible to immediately convert the row number specified in one table into the range of row numbers of the other table by a computational algorithm so as to obtain the relationship between two tables from computational logic alone. Therefore, the data processing can be performed at an extremely high speed compared to this type of conventional data processing system. Further, the processing is enabled in consideration of computational logic alone, which makes the processing speed constant irrespective of the amount of data.

Furthermore, even if the number of customer tables 23 increases, the number of rows per customer ID has only to be described in the number of row managing table 22 for each table, which makes it easy to join tables. In addition, since the tables can be joined merely by recording data in each table, data processing is enabled at a speed independent of the number of tables.

As described above and according to the present invention, data processing the load of which is independent of the size of data. Therefore, the present invention can display such an effect as to prevent a reduction in system processing speed due to an increase in data.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A data processing system having a storage device for recording data which belongs to an object representing a target event, in which one or more tables are stored in the storage device, each of the tables defining the number of data recordable areas, and each of the objects and recording areas in each table individualized by an identifier capable of taking numerical form, said system comprising:

specification means for specifying an identifier related to the data concerned and the number of recording areas of the table to be accessed in response to a data accessing request;

range of area determining means for determining the range of recording areas in the table to be accessed by executing a predetermined computational algorithm which uses as variable factors at least the identifier and the number of recording areas specified by said specification means; and recording area managing means for recording the number of data recording areas assignable to each object in each of said one or more tables;

wherein said specification means specifies the number of recording areas of the table to be accessed by checking said recording area managing means in response to the data accessing request, and wherein said accessing request is executed with regard to said determined range of recording area.

2. The data processing system according to claim 1, wherein said specification means specifies an object identifier (M) and the number or recording areas (N) per customer of the table to be accessed, and said range of area determining means determines the range or recording areas capable of being accessed in the table concerned by executing the following computational algorithm from the identifier (M) and the number of recording areas (N) specified:

N*[M−1]+1~N*M, where the term inside the square brackets indicates an integral value calculated by a Gauss function.

3. The data processing system according to claim 1, wherein, said specification means specifies an identifier ($\alpha a$) of a recording area of a first table in which data belonging to the target object is to be recorded, as well as the number of recording areas (Na) per object of the first table and the number of recording areas (Nb) per object of a second table in which data associated with the first object by the target object are to be recorded, and said range of area determining means determines the range of data recording areas capable of being accessed in the second table by executing the following computational algorithm from the identifier ($\alpha a$) and the respective numbers of recording areas (Na, Nb):

[$\alpha a$/Na]*Nb+1~[$\alpha a$/Na+1]*Nb, where the term inside the square brackets indicates an integral value calculated by a Gauss function.

4. The data processing system according to claim 1, further comprising:

means for accepting a table join request for joining first and second tables associated with each other by an object and retrieval conditions therefor;

means for decomposing the accepted retrieval conditions on a table basis; and retrieval means for executing the table join request accepted, wherein said specification means specifies an identifier ($\alpha a$) of a corresponding recording area from the first table on the basis of the retrieval condition decomposed for the first table, as well as the number of recording areas (Na) per object of the first table ant the number of recording areas (Nb) per object of the second table, said range of area determining means determines the range of recording areas to be retrieved in the second table by executing the following computational algorithm from the identifier ($\alpha a$) and the respective numbers of recording areas (Na, Nb):

[$\alpha a$/Na]*Nb+1~[$\alpha a$/Na+1]*Nb, where the term inside the square brackets indicates an integral value calculated by a Gauss function, and said retrieval means performs data retrieval processing for the range of recording areas determined by said range of area determining means according to the retrieval condition for the second table.

5. The data processing system according to claim 1, further comprising:

means for accepting a table join request for joining first and second tables associated with each other by an object and retrieval conditions therefor;

means for decomposing the accepted retrieval conditions on a table basis; and retrieval means for executing the table join request accepted, wherein said specification means specifies an identifier ($\alpha a$) of a corresponding recording area from the first table on the basis of the retrieval condition decomposed for the first table, as well as the number of recording areas (Na) per object of the first table and the number of recording areas (Nb) per object of the second table, said range of area determining means determines the range of recording areas to be retrieved in the second table by executing the following computational algorithm from the identifier ($\alpha a$) and the respective numbers of recording areas (Na, Nb):

[$\alpha a$/Na]*Nb+1~[$\alpha a$/Na+1]*Nb, where the term inside the square brackets indicates an integral value calculated by a Gauss function, and said retrieval means performs data retrieval processing according to the retrieval condition for the second table to determine the logical product of the identifier of a recording areas of the range obtained in the retrieval processing and the identifiers of all the recording areas of the range determined by said range of area determining means so as to specify recording areas in which data according to all the retrieval conditions are to be recorded.

6. The data processing system according to claim 1, wherein the recording areas are formed consecutively in each individual table on a row or column basis, and the identifier is a row or column number in the table concerned.

7. A data processing system having a storage device for recording data which belongs to an object representing a target event, in which one or more tables are stored in the storage device, each of the tables defining the number of data recordable areas, and each of the objects and recording areas in each table individualized by an identifier capable of taking numerical form, said system comprising:

a data recording module for accessing said storage device and recording data in recording areas of any one of tables in response to input of the data concerned and a data recording request, and a data retrieval module for accessing said storage device and retrieving the data concerned from one of the tables in response to a retrieval request;

wherein one of said data recording and retrieval modules is configured to specify an identifier related to the data to be targeted and the number of recording areas of the table to be accessed, determine the range of recording areas in the table to be accessed by executing a predetermined computational algorithm which uses as variable factors at least the identifier and the number of recording areas specified, and execute said search request to the determined range of recording areas; and further comprising recording area managing means for recording the number of data recording areas assignable to each object in each of said one or more tables;

wherein said number of recording areas of the table to be accessed is specified by checking said recording area managing means.

8. A data processing method for use in a computer system having a storage device for recording data which belongs to an object representing a target event, in which one or more tables are stored in the storage device, each of the tables defining the number of data recordable areas per object, and each of the objects and recording areas in each table individualized by an identifier capable of taking numerical form, said method comprising the steps of:

specifying an identifier related to the data concerned and the number of recording areas of the table to be accessed in response to an access request for the data containing identification information for identifying the object;

determining the range of recording areas in the table to be accessed by executing a predetermined computational algorithm which uses as variable factors at least the identifier and the number of recording areas specified by said specification means; and said computer system further having recording areas managing means for recording the number of data recording areas assignable to each object in each of said one or more tables;

wherein said number of recording areas of the table to be accessed is specified by checking said recording area managing means, and wherein said accessing request is executed with regard to said determined range of recording area.

9. A computer-readable recording medium on which a computer program is recorded, the computer program being used in a computer system having a storage device for recording data which belongs to an object representing a target event, in which one or more tables are stored in the storage device, each of the tables defining the number of data recordable areas per object, and each of the objects and recording areas in each table individualized by an identifier capable of taking numerical form, and said computer system further having recording area managing means for recording the number of data recording areas assignable to each object in each of said one or more tables, said computer program executing the following processing steps of:

specifying an identifier related to the data concerned and the number of recording areas of the table to be accessed in response to an access request for the data containing identification information for identifying the object;

determining the range of recording areas in the table to be accessed by executing a predetermined computational algorithm which uses as variable factors at least the identifier and the number of recording areas specified, wherein said number of recording areas of the table to be accessed is specified by checking said recording area managing means; and executing said accessing request with regard to said determined range of recording area.

10. A computer program for use in a computer system having a storage device for recording data which belongs to an object representing a target event, in which one or more tables are stored in the storage device, each of the tables defining the number of data recordable areas per object, and each of the objects and recording areas in each table individualized by an identifier capable of taking numerical form, and said computer system further having recording area managing means for recording the number of data recording areas assignable to each object in each of said one or more tables, said program constructing:

specification means for specifying an identifier related to the data concerned and the number of recording areas of the table to be accessed in response to a data accessing request for the data containing identification information for identifying the object;

range of area determining means for determining the range of recording areas in the table to be accessed by executing a predetermined computational algorithm which uses as variable factors at least the identifier and the number of recording areas specified by said specification means, wherein said number of recording areas of the table to be accessed is specified by checking said recording area managing means; and executing means for executing said accessing request with regard to the determined range of recording areas.

* * * * *

UNITED STATES PATENT AND TRADEMARK OFFICE
CERTIFICATE OF CORRECTION

PATENT NO. : 7,162,491 B2  Page 1 of 1
APPLICATION NO. : 10/066212
DATED : January 9, 2007
INVENTOR(S) : Takashi Ishizaka It is certified that error appears in the above-identified patent and that said Letters Patent is hereby corrected as shown below:

Col. 11, Line 5
Claim 1 line 5, --per object-- should be inserted after "areas".

Col. 12, Line 7
Claim 4 line 14, "ant" should be corrected to --and--.

Col. 12, Line 27
Claim 5 line 27, "areas of the range" should be corrected to --area of the range--.

Col. 12, Line 63
Claim 7 line 5, --per object-- should be inserted after "areas".

Signed and Sealed this

Twelfth Day of June, 2007

JON W. DUDAS
*Director of the United States Patent and Trademark Office*